E. A. Hall,
Floor Clamp.
Nº 77,610.   Patented May 5, 1868.

Witnesses:   Inventor:

United States Patent Office.

EDWIN A. HALL, OF SUGAR BRANCH, INDIANA.

Letters Patent No. 77,610, dated May 5, 1868.

IMPROVEMENT IN FLOOR-CLAMPS.

*The Schedule referred to in these Letters Patent and making part of the same.*

TO WHOM IT MAY CONCERN:

Be it known that I, EDWIN A. HALL, of Sugar Branch, Switzerland county, and State of Indiana, have invented a certain new and useful Flooring-Clamp; and do hereby declare the following to be a full, clear, and exact description thereof, reference being had to the accompanying drawings, making part of this specification.

My invention relates to a clamp for enabling the boards of a floor to be drawn or pressed tightly together previous to nailing.

I provide a piece called by me the "dog," consisting of a plate, A, which rests upon the joist, and two cheeks B B', which embrace the joist on opposite sides thereof, and gripe the same tightly when in action.

The plate A has an upwardly-projecting stud, $a$, which serves as a pivot for an eccentric-cam, C, having two ribs, $c\ c'$, and a screw, D, by which the handle or lever E is made fast on the cam. The lever has two screw-holes, $e\ e'$, so as to enable it to be attached to the cam in the position shown in fig. 1, for operation on the first few boards, and in the position shown in fig. 2 for operation on the others.

Figure 1:
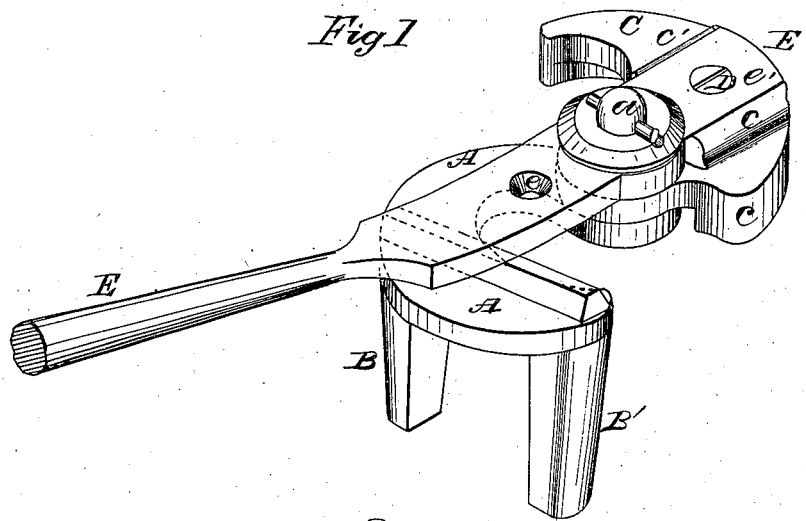
Figure 1 is a perspective view of my clamp with its handle in position for operating on the first few boards.
Figure 2:
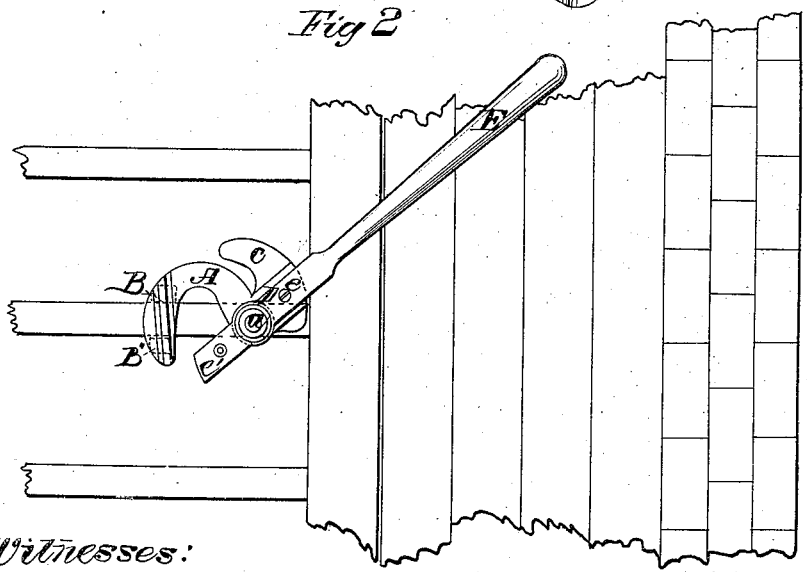
Figure 2 is a top view of the clamp with its handle shifted for application after the first few boards have been laid.

In nailing the first few boards to the joists, the lever is attached to the cam, as shown in fig. 1, so as to enable it to operate without collision with the wall of the room, but after a sufficient number of boards have been secured to enable the carpenter to stand upon them, the position of the handle is reversed, (see fig. 2,) and the operator then works by drawing the lever towards him, and without stepping upon the joists to grasp it.

I claim herein as new, and of my invention—

The arrangement of dog A B B' $a$, eccentric-cam C, and reversible lever E $e\ e'$, substantially as set forth.

In testimony of which invention, I hereunto set my hand.

EDWIN A. HALL.

Witnesses:
GEO. H. KNIGHT,
JAMES H. LAYMAN.